Oct. 25, 1960    J. F. DRIVER ET AL    2,957,366
WHEEL BALANCING DEVICE
Filed Dec. 10, 1957    2 Sheets-Sheet 1

INVENTORS
JOHN F. DRIVER +
GORDON BRADLEY
BY
Charles S. Penfold
ATTORNEY

Oct. 25, 1960 J. F. DRIVER ET AL 2,957,366
WHEEL BALANCING DEVICE
Filed Dec. 10, 1957 2 Sheets-Sheet 2

INVENTOR.
JOHN F. DRIVER &
GORDON BRADLEY
BY
Charles S. Penfold
ATTORNEY

United States Patent Office 2,957,366
Patented Oct. 25, 1960

2,957,366

WHEEL BALANCING DEVICE

John F. Driver, 524 W. 4th St., and Gordon Bradley, 3005 Fairfield Ave., both of Fort Wayne, Ind.

Filed Dec. 10, 1957, Ser. No. 701,890

12 Claims. (Cl. 74—573)

This invention relates to balancing weights for wheels such as grinding wheels, motor vehicle wheels, and wheels for various other purposes, and in particular, a weight or weights adapted to be attached to a wheel wherein each weight is provided with a plurality of smaller weights and the smaller weights are actuated by screws whereby minute adjustment is provided and with the larger weights slightly off balance absolute balance may be obtained by adjusting the positions of the smaller weights.

The purpose of this invention is to provide auxiliary means in a balancing weight whereby, with the balancing weight in substantially the correct position for balancing a wheel or the like, the wheel may be brought into perfect balance by adjusting the position of the auxiliary means in the balancing weight.

Balancing weights are used universally for bringing rotating wheels into correct balance, however, after such weights are attached to wheels, it is difficult to move the weights from one position to another and minute or accurate adjustment thereof is, consequently, difficult. With this thought in mind, this invention contemplates the combination of small auxiliary weights with balancing weights whereby with the balancing weights substantially in correct positions the positions of auxiliary weights thereon may be adjusted to bring a wheel on which the balancing weights are positioned into correct balance without moving the balancing weights.

The object of this invention is, therefore, to provide means for moving parts of balancing weights whereby with the body of the weight secured to a rim or other part of a wheel the moving parts are adapted to be adjusted on the balancing weights to bring a wheel upon which the balancing weights are positioned into correct balance.

Another object of the invention is to provide balancing weights having adjustable elements in combination therewith in which the balancing weights are adapted to be mounted on wheels now in use without changing parts of the wheels.

A significant object of the invention is to provide a substantially arcuately shaped balancing weight which is adapted for circumferential adjustment and attachment in an annular recess or groove provided in a wheel.

An important object of the invention is to provide a weight with locking means for forcibly engaging the material of the wheel defining one side or wall of the annular recess to cause a large peripheral area of the weight to forcibly and intimately engage or contact the material defining the opposite side or wall of the recess to firmly secure or anchor the weight in place against accidental displacement. This organization is preferably such that the large contacting or engaging area of the weight will engage the outer wall of the recess and the locking means will engage the inner wall of the recess so that the centrifugal force imparted to the weight through rotation of the wheel will assist in forcing and holding the weight against said outer wall.

Another important object of the invention is to provide a primary balancing weight which carries a pair of corresponding secondary or auxiliary weights preferably designed and constructed in the form of screws which are connected to the extremities of the primary weight for accurately balancing the wheel after the primary weight has been anchored in place by the locking means.

A specific object of the invention is to provide means whereby to facilitate manipulation of the secondary screw weights and means for selectively locking these weights in place on the primary weight after they have been correctly adjusted.

Another object of the invention is to provide a wheel with an annular groove or recess of which the outer wall thereof is inclined toward the inner wall and the outer large peripheral contact area of the primary weight is bevelled for engaging the inclined wall in a manner whereby to assist in loosely holding the weight in the groove, particularly when the weight is being arcuately moved in the groove for adjustment and securement.

Also, an object is to provide a device comprised of a minimum number of components for efficiently achieving the results desired.

A further object of the invention is to provide balancing weights for wheels in which the balancing weights are provided with adjustable elements and in which the balancing weights with the adjustable elements are of simple and economical construction.

With these and other objects and advantages in view, the invention embodies balancing weights having cap screws therein for attaching the weights to wheels and also having elongated slots therein with screws extended through the slots and with small weights positioned in the slots and mounted on the screws.

Other features and advantages of the invention will appear from the following description, taken in connection with the drawings, wherein.

Figure 1:
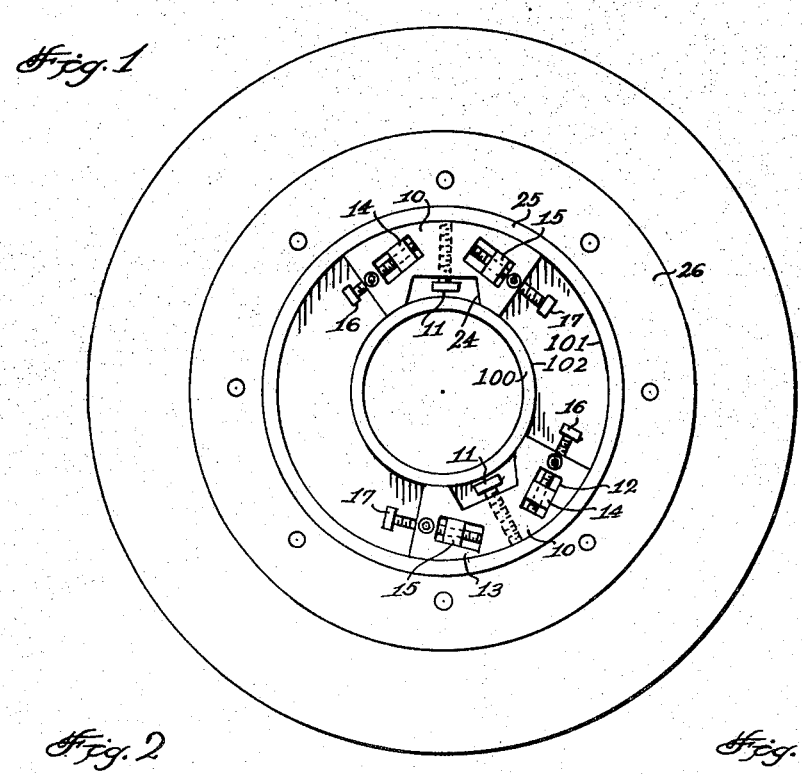
Figure 1 is a side elevational view of a wheel having balancing weights with auxiliary weights in combination therewith mounted on the rim thereof.

Referring now to the drawing, wherein like reference characters denote corresponding parts, the improved combination wheel balancing weight of this invention includes a body 10 having a mounting screw 11 threaded therethrough and elongated slots 12 and 13 therein, auxiliary weights 14 and 15 positioned in the slots 12 and 13, respectively, and cap screws 16 and 17 threaded in the auxiliary weights and having annular recesses 18 in shanks 19 thereof, the recesses being positioned in registering relation with set screws, such as the Phillips head screws 20, threaded in end section 21 and 22 of the body of the weight.

The body 10 is provided with an arcuate outer surface 23 and the inner surface is provided with a recess 24 in which the head of the screw 11 is positioned.

By this means the body 10 of the balancing weight is secured by the screw or bolt 11 to a rim 25 of a wheel 26 and with the weight approximately positioned the auxiliary weights 14 and 15 are actuated by the screws 16 and 17 to accurately balance the wheel. The wheel also includes a hub 100 disposed in concentric relationship to the rim 25 to define an annular recess in which one or more of the weight assemblies are arranged. The rim 25 is provided with an arcuate surface 101 and the hub 100 with an arcuate surface 102, which surfaces are respectively engaged by outer and inner parts or portions of the weight assemblies.

Figures 2, 5:
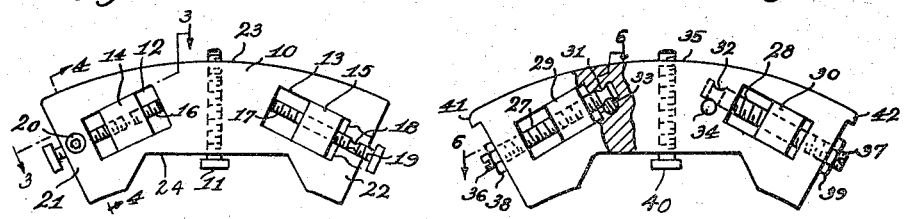
Figure 2 is a side elevational view illustrating one of the balancing weights of the wheel shown in Figure 1, the parts being shown on an enlarged scale and small auxiliary weights in slots of the balancing weights being mounted on cap screws extended longitudinally through the slots in the balancing weights.
Figure 5 is a side elevational view of a balancing weight, showing a modification wherein small auxiliary weights are mounted on threaded studs and in which the studs are provided with lock nuts.
Figures 3, 6:
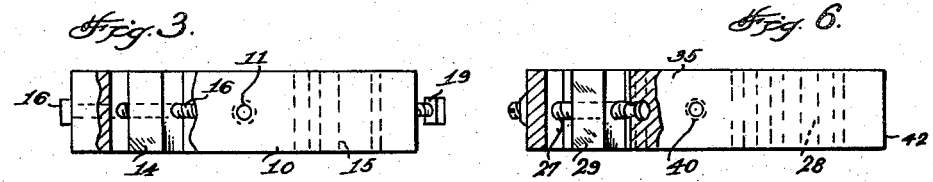
Figure 3 is a plan view of the weight shown in Figure 2 with part of the weight broken away showing a section on line 3—3 of Figure 2.
Figure 6 is a plan view of the weight shown in Figure 5 with parts broken away and shown in section and with the part shown in section taken on line 6—6 of Figure 5.
Figure 4:
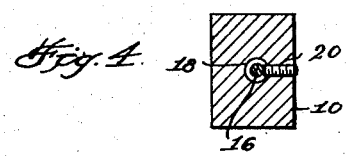
Figure 4 is a cross section through one end of the weight shown in Figure 2, said section being taken on line 4—4 of said figure.

In the design illustrated in Figures 5 and 6, the cap screws are replaced with threaded studs 27 and 28 on which weights 29 and 30 are threaded and the inner ends of the studs are provided with annular recesses 31 and 32 through which pins 33 and 34 for retaining the studs in the weights extend, the body of each weight being indicated by the numeral 35. The outer ends of the studs are provided with screwdriver slots, as indicated by the numerals 36 and 37, and the studs are secured in adjusted positions with lock nuts 38 and 39. The body 35 of the weight is provided with a mounting screw 40 and the ends are provided with projections 41 and 42 to overlap and protect the lock nuts and ends of the studs.

In balancing a wheel with the balancing weight of this invention, the weight, or a plurality of weights, as illustrated in Figure 1, may be attached to the hub of a wheel with the mounting cap screws or bolts 11 or 40 being disposed for engaging the hub 100 and when it is found that the weights are not accurately positioned so that the wheel is exactly balanced the positions of the auxiliary weights are adjusted by turning the cap screws or studs until the wheel is in accurate balance.

Referring to the modified form of the invention exemplified in Figures 7 through 10 of the drawing, numerals 43 generally designate a pair of corresponding or identical weight balancing devices which are mounted in an annular recess or groove provided in a component 44, such as the hub or rim of a wheel 45.

The annular recess may be designed and constructed as desired but as shown it is defined by a radial planar base wall 46, an inner axially extending circumferential side wall 47 disposed perpendicular to the base wall, and an outer axially extending circumferential side wall 48 preferably inclined toward the inner side wall. In other words, the annular recess may be termed a recess of the dove-tail character, the purpose of which will be described more in detail subsequently.

The devices 43 may be designed and constructed in various ways but as shown, each device comprises a generally arcuate shaped body which is preferably of cast metal and constitutes a primary weight, a pair of corresponding secondary weights 49, and a locking means 50 carried by the body.

Figure 7:
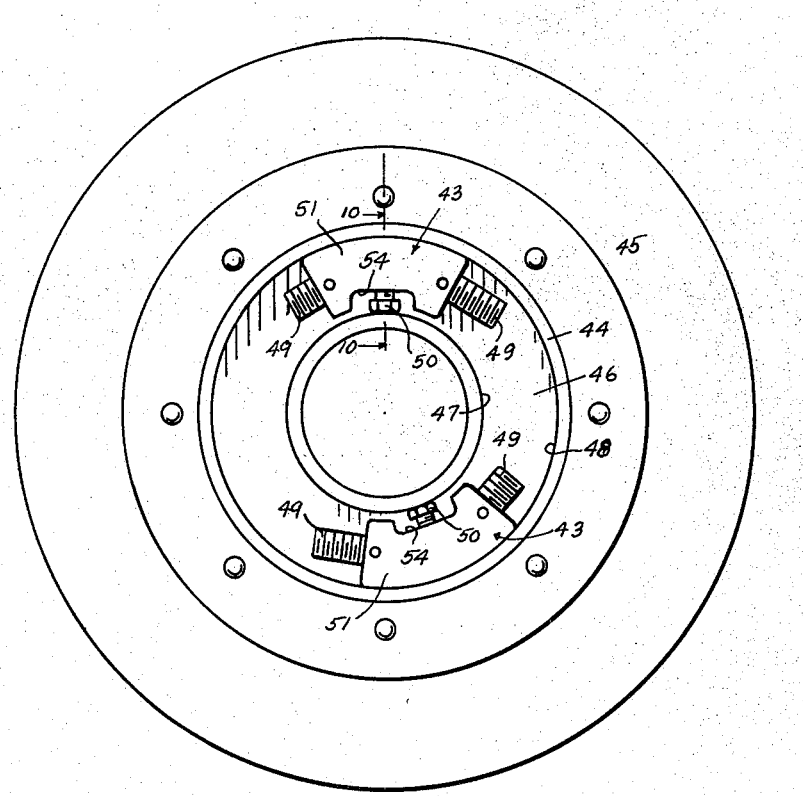
Figure 7 is a side elevational view, similar to Figure 1, and exemplifies a modified form of a weight balancing device applied to a wheel.
Figure 8:
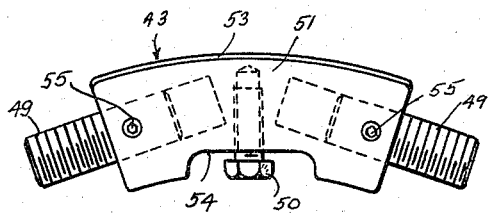
Figure 8 is an enlarged side elevational view of one of a pair of devices adapted for connection with the wheel.
Figure 10:
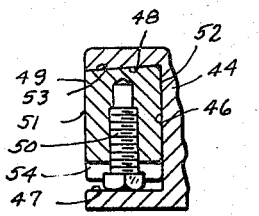
Figure 10 is a transverse sectional view taken substantially on line 10—10 of Figure 7.
Figure 9:
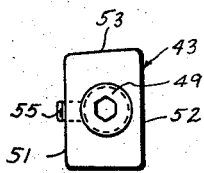
Figure 9 is an end elevational view of the weight shown in Figure 8.

Each of the primary weights or bodies is preferably substantially rectangular in cross-section throughout its length and of a size to nest substantially within the confines of the annular recess as disclosed in Figures 7 and 10. Each body includes a pair of parallel side surfaces 51 and 52, an outer arcuate bevelled or inclined bearing surface 53, and an inner arcuate surface which is substantially concentric or parallel to the outer arcuate surface and provided with an interruption in the form of a notch 54. The lockings means 50 on each of the primary weights or bodies is preferably in the form of a screw which threadedly engages a transverse radially disposed threaded aperture provided in each body which intersects a flat or chordal base of each of the notches 54. The hexagonal head of each screw is more or less inset within the confines of a notch for clearance purposes as shown.

The end surfaces of each body are preferably disposed at an acute angle with respect to one another or it may be stated that the end surfaces are substantially radially arranged. The ends of each body are respectively provided with threaded apertures which extend generally longitudinally of the body. Otherwise expressed, the end apertures are substantially chordally arranged and substantially converge in directions toward one another so that their axes intersect an extended axis of the locking screw 50 at a location within the confines of the body.

The end apertures in each body are of a size and depth to respectively accommodate the pair of secondary weights 49 which are preferably threaded or in the form of screws. The outer ends of these screws are respectively provided with hexagonal recesses for receiving a tool to facilitate selective manipulation of the screws in the apertures to correctly balance the wheel after each body or primary weight is secured in place. Small set screws 55 may be provided on each body for respectively engaging and locking the larger screws or secondary weights 49 in place after the latter are adjusted.

With the foregoing in mind, the devices are utilized by placing them in the annular recess so that their side surfaces 52 engage the base wall 46 of the recess and their outer bevelled arcuate surfaces 53 engage the outer inclined circumferential side wall 48 of the recess. The locking screws on the primary weights are of course first manipulated so their head are substantially located withing the confines of the notches 54 so they will not interfere with positioning the devices in the recess. The locking screws, if desired, can be so adjusted that when the devices are placed in the recess the heads of the locking screws and the outer arcuate bearing surfaces of the primary weights will respectively loosely engage the inner and outer walls of the recess in a manner whereby the weights will be more or less trapped in the recess against accidental release while permitting circumferential adjustment of the weights to the positions desired. When each primary weight has been adjusted to the position required, its locking screw 50 is manipulated so that its head will forcibly engage the inner wall of the recess at a centralized point or location between the ends of the weight and its outer arcuate bearing surface will be forcibly urged into intimate contact or engagement with a relatively large area of the outer side wall of the recess to firmly secure or anchor the weight in place.

When each of the primary weights is thus secured, the secondary weights 49 on each can be readily manipulated to obtain an accurate or correctly balanced wheel, after which the set screws 55 can be employed to lock the secondary weights in place. The outer end of each set screw is preferably provided with a hexagonal recess for receiving a tool to facilitate manipulation of these screws.

As alluded to above, the organization of components is preferably such that the centrifugal force imparted to devices assists in holding the devices against the outer inclined side walls of the recess and the dove-tail character of the recess and shape of the weights also contribute to the holding action.

The modified structure exemplified in Figures 7 through 10 of the drawings has proven very satisfactory and efficient in commercial use and offers advantages over the structures illustrated in Figures 1 through 6, with respect to costs in manufacture and assembly, rapidity in installation and durability.

Having thus described our invention, it is obvious that various modifications may be made in the same without departing from the spirit of the invention, and, therefore, we do not wish to be understood as limiting ourselves to the exact forms, constructions, arrangements, and combinations of parts herein shown and described.

We claim:

1. A balancing weight for use on a wheel having an annular portion, said weight comprising a body having an arcuate surface and having spaced elongated slots therein, weights positioned in the slots of the body, means for adjusting the positions of the weights in the slots, and means for mounting the balancing weight on a wheel with the arcuate surface forcibly positioned against an annular surface of the annular portion of the wheel.

2. In a balancing weight for use on a wheel, the combination which comprises a body having elongate converging slots therein and having an arcuate surface, a cap screw extended through the body and positioned to adjustably secure the body to a wheel with the arcuate surface forcibly positioned against a surface of the rim of the wheel, screws extended through parts of the body and also extended longitudinally through said slots, means for rotating the screws, weights positioned in the slots and threaded on said screws.

3. In a balancing weight for a wheel, the combination which comprises an elongate body having an arcuate surface and having spaced converging slots extending through the body, screws mounted in the body and extended longitudinally and convergingly through the slots, auxiliary weights positioned in the slots and mounted on said screws, means for preventing accidental displacement of the screws from the body, means for locking the screws in adjusted positions in the body, and means carried by the body for adjustably securing the weight to a wheel.

4. In a balancing weight for a wheel, the combination which comprises an elongate body having an arcuate surface and having spaced converging slots extended therethrough, screws mounted in the body and extended longitudinally and convergingly through the slots, auxiliary weights positioned in the slots and mounted on said screws, means for preventing accidental displacement of the screws from the body, means for locking the screws in adjusted positions in the body, and means extended through the body for securing the body to the rim of a wheel.

5. A device of the kind described comprsiing an elongate primary weight provided with threaded apertures adjacent its extremities, a pair of secondary weights having external threads thereon adjustably engaging the threads defining said apertures, and means carried by the primary weight for movement in a direction transverse to its length for securing the device to a wheel.

6. A device of the kind described comprising an arcuate shaped primary weight, a pair of threaded apertures respectively extending inwardly from the ends of the weight in a chordal relationship, screws respectively adjustably engaging said apertures and constituting secondary weights, and means carried by the primary weight for adjustably securing it in a fixed position on a wheel.

7. In combination: a rotary member provided with an axially extending annular recess having an inner side wall and an outer side wall, an elongated weight disposed in said recess, said weight being provided with an outer bearing surface disposed in opposed relation to the outer side wall of the recess, and a locking element carried by the weight forcibly engaging the inner side wall of the recess at a location between the ends of the weight to cause the bearing surface on the weight to forcibly engage the outer side wall of said recess for locking the weight in place.

8. In combination: a rotary member provided with an open faced axially extending annular recess having an outer circumferential side wall and an inner circumferential side wall, an arcuate shaped primary weight disposed in the recess, said weight having an outer portion provided with a bearing surface for engaging the outer side wall of the recess, said weight also having an inner portion provided with a notch, and a locking element carried by the weight and having an end substantially disposed in the notch for engaging the inner side wall of the recess in a manner whereby to cause the outer bearing surface on the weight to forcibly and intimately engage an area of the outer side wall of the recess which is considerably greater than the contact area between the end of the locking element and said inner wall of the recess.

9. The structure defined in claim 8, including a pair of screws respectively threadedly connected to the extremities of the weight for balancing the weight on the rotary member.

10. The structure defined in claim 8, including means for holding the locking element in place after adjustment.

11. In combination: a rotary member provided with an annular recess having an inner arcuate surface and an outer arcuate surface, an elongate weight disposed in the recess for circumferential adjustment therein, said weight being provided with a bearing surface disposed in opposed relation to one of the arcuate surfaces, and a locking element carried by the weight for forcibly engaging the other arcuate surface at a location between the extremities of the weight to cause the bearing surface on the weight to forcibly engage said one arcuate surface for locking the weight in place.

12. The combination defined in claim 11, including a pair of secondary weights respectively adjustably carried by the extremities of the primary weight.

References Cited in the file of this patent

UNITED STATES PATENTS

| | | |
|---|---|---|
| 209,475 | Harris | Oct. 29, 1878 |
| 416,253 | Bordman | Dec. 3, 1889 |
| 1,138,592 | Little | May 4, 1915 |
| 1,158,712 | Nichols | Nov. 2, 1915 |
| 1,314,575 | Davidson | Sept. 2, 1919 |
| 1,438,768 | Lapham | Dec. 12, 1922 |
| 1,497,735 | Richardson | June 17, 1924 |
| 1,746,476 | House | Feb. 11, 1930 |
| 1,768,851 | Lamb | July 1, 1930 |
| 1,825,610 | Wood | Sept. 29, 1931 |
| 2,238,989 | Bradbury | Apr. 22, 1941 |
| 2,385,252 | Bennett | Sept. 18, 1945 |
| 2,441,619 | Dailey et al. | May 18, 1948 |
| 2,665,546 | Van Hoaften | Jan. 12, 1954 |